Figure 2:
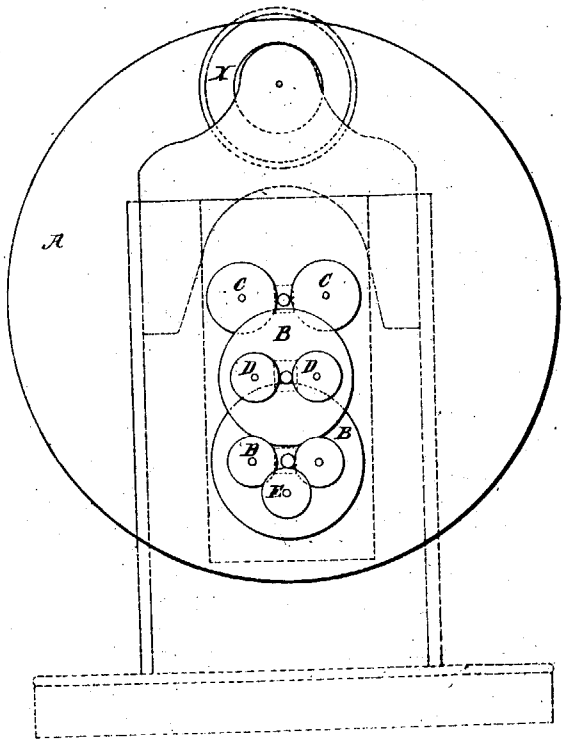
Figure 1:
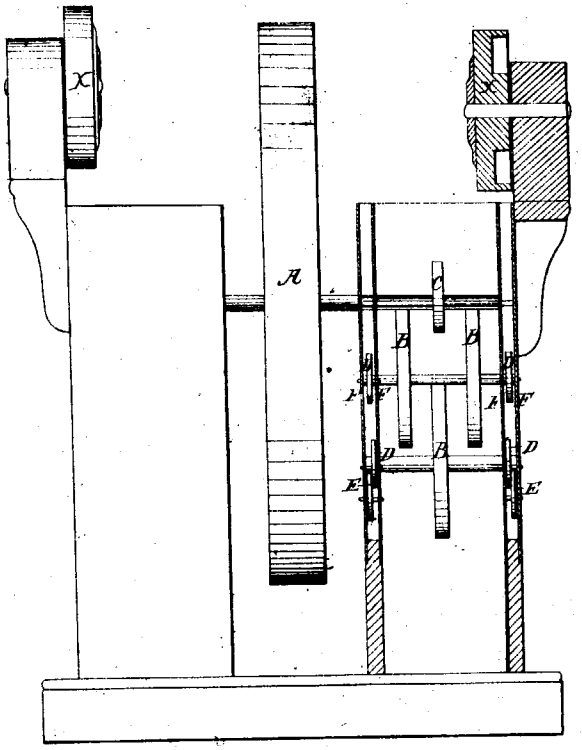

8399X

I. Clome,

Anti-Friction Roller,

Patented Sept. 9, 1834.

8399X

Isaac Clowes.

Letters Patent.

The Schedule referred to in these Letters Patent and ma-
king part of the same, containing a description in the words of
the said Isaac Clowes himself, of his improvement in over=
coming friction on all kinds of Machinery by the application
of compound friction rollers.

To all to whom these presents shall come.
Be it known; that I, Isaac Clowes, of Norfolk Borrough in
the County of Norfolk, and State of Virginia, have invented a
new and useful improvement in the art of overcoming, or
lessening of friction on all kinds of Machinery by the appli=
cation of compound friction rollers and that the following is
a full and exact description of the construction and operation of the in
machine as invented or improved by me, to show the advantages resulting
from the application of friction rollers to all kinds of Machinery.
First I have eight or more frames made of brass, copper, cast
or bar iron, or any other Material sufficiently strong to sustain
the weight required, according to the size of the Machine, and so
constructed as to contain seventeen large friction rollers between
four of those frames. By screw=bolts. There is to be attached (on a
large scale) seven movable metal boxes, to each frame, in which the gudg
eons of fourteen of the friction rollers play, surrounded by small friction
rollers in each box, of any size, or metal, according to fancy. My model is
built on a small scale, of half an inch to the foot, except the gudgeons, which
are 1/4 of an inch to the foot, and exhibit my full plan and manner of placing
my large compound friction rollers, without the movable boxes, and the small
friction rollers in them, in which the gudgeons of the large friction rollers
play, which I also claim as my invention. The large wheel
represents the large wheel of a grist mill, or steam boat, of sixteen
feet

8349X feet diameter, with its gudgeons or axles kept on the periphery
of the two large friction rollers, by two small side friction
rollers of one inch diameter. Each of those F. rollers are on
a scale of one inch to the foot. Then the axles of this large, two
inch double friction roller is kept in its station with the centre
of its axle revolving on the periphery of one large friction roller
of 3¼ inches diameter, and is kept in its station by four side
friction rollers; then this large 3¼ inch friction roller is
likewise kept in its station by four other side friction rollers;
the gudgeons of which role over on the periphery of two other
large F rollers of one inch and ¼ diameter, the gudgeons of
these inch and quarter F. rollers play in the brass boxes as you
see in this model, as do all the side friction rollers, which I
claim as my invention, but on a large scale, they will all
play in the boxes surrounded by the small friction rollers as
above stated. The axletrees of a carriage, car, or gudgeon of
a mill, may be turned off, much smaller than usual, not allowing
any thing for wear; then to prevent their wear altogether, a brass
composition or metal box is placed permanent onto them, which
makes them but little, if any, larger than is common, when
calculating them to wear a long time. Three four of those
frames are to be attached together at proper distances, with screw
bolts and thimbles or washers, with all their friction rollers
as above stated, and are to be placed under each gudgeon
of a steam boat or grist mill, or on the top of each axletree of
a car, or carriage, where the friction is intended to be lessened
or overcome. What I claim as my invention or improve
-ment, is, the mode of preventing the axles or gudgeons from
wear by applying composition or metal boxes of any kind,
stationary or otherwise, around them, and the method of
applying the large friction rollers with the frames and mova
-ble boxes, & with or without the small friction rollers under
the gudgeons of the large friction rollers, which are not
immediately immediately under the axles of cars or gudgeons &c, as usual or heretofore applied, preventing both friction and wear on those large friction rollers that move remarkably slow to what the axletrees or main gudgeons do.

Witnesses
Robt. Clarke
Henry Clerke

Isaac Clowes.

(Age 27 yrs)

Drawing (Granted September 9. 1834)